July 6, 1954  W. C. ROUSSEAU  2,683,110
DEHYDRATION OF DICARBOXYLIC ACIDS
Filed April 1, 1947
FIG. I.
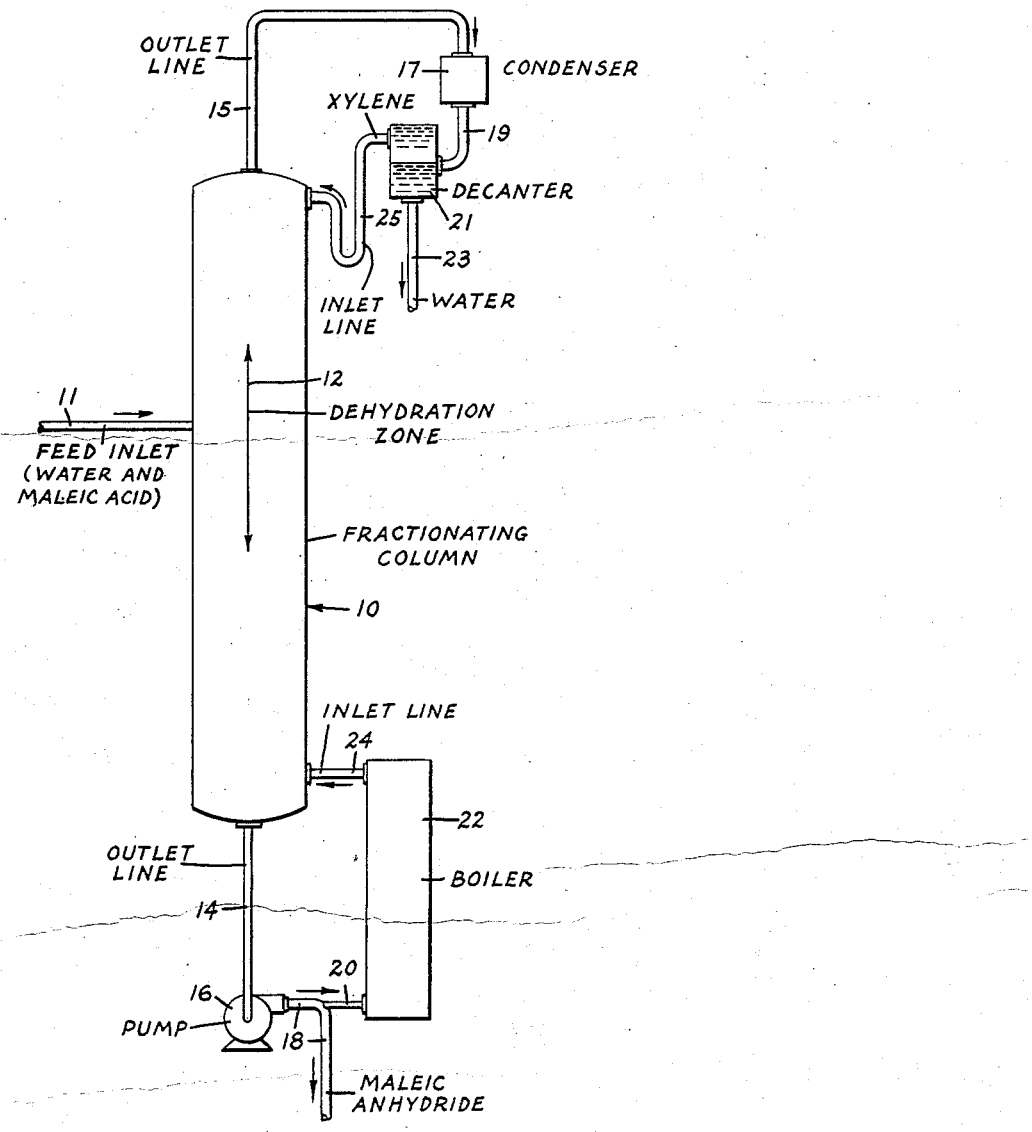
INVENTOR.
WILLIAM C. ROUSSEAU
BY
Campbell, Brumbaugh & Free
HIS ATTORNEYS.

Patented July 6, 1954

2,683,110

UNITED STATES PATENT OFFICE 2,683,110

DEHYDRATION OF DICARBOXYLIC ACIDS

William C. Rousseau, Reading, Mass., assignor, by mesne assignments, to Stone & Webster Engineering Corporation, Boston, Mass., a corporation of Massachusetts Application April 1, 1947, Serial No. 738,701

10 Claims. (Cl. 202—42)

This invention relates to the dehydration of carboxylic acids to the corresponding acid anhydrides, and more particularly to the treatment of a water solution of maleic acid in order to convert the acid to maleic acid anhydride in a continuous manner.

Maleic acid is readily prepared from benzene by oxidation in the presence of a catalyst, followed by absorption of the reaction products in water to give a water solution of the acid.

It has been proposed heretofore to process a water solution of maleic acid in a batch manner to remove the free water therefrom and also to dehydrate the acid to the anhydride, and it has been proposed to employ a volatile water immiscible material as an entraining agent in such a batch process. A major difficulty with any process wherein maleic acid is subjected to elevated temperature for any considerable length of time is the isomerization of maleic acid to fumaric acid, thus reducing the yield of maleic anhydride obtained. It has been proposed heretofore to treat anhydrous maleic acid in a somewhat continuous manner at elevated temperature conditions, so as to convert the acid to the anhydride and free water, with vaporization of both the water and the maleic anhydride. The maleic anhydride is separated from the vapor mixture by fractional condensation therefrom. A major problem with this procedure is the isomerization of maleic acid to fumaric acid, and in addition, the water and maleic anhydride in the vapor mixture tend to react to form maleic acid, and thus decrease the yield of maleic anhydride recovered.

In accordance with the invention, it has been found that the above disadvantages can be overcome and that maleic acid may be readily converted to maleic anhydride in a continuous manner. An aqueous solution of the acid may be employed as the starting material. The maleic acid is subjected to an elevated temperature in the presence of a volatile, water-immiscible entraining agent, such as xylene, which does not undergo chemical reaction in the system. The water and entraining agent are removed as overhead vapors and the maleic anhydride is removed as bottoms; i. e., both the water and the entraining agent boil under the dehydration conditions. The maleic acid is subjected for a definitely controlled short period of time to an optimum temperature for dehydration, and water is rapidly removed from contact with maleic anhydride. The isomerization of maleic acid to the undesirable by-product, fumaric acid, is kept at a minimum.

The objects achieved in accordance with the invention include the provision of a continuous process for converting dicarboxylic acids to their acid anhydrides in a continuous and efficient manner; the provision of a process for the treatment of aqueous maleic acid to convert the acid therein to the acid anhydride in a continuous and efficient manner; and other objects which will be apparent as embodiments and details of the invention are set forth hereinafter.

Reference may be had to the accompanying drawing, for an illustration of one embodiment of the invention. This is for illustrative purposes only and is not to be construed as a limitation of the invention as it is otherwise disclosed and set forth herein.

In the figure, a water solution of maleic acid, e. g., 40 weight per cent solution which may be readily obtained by adsorption in water of maleic anhydride produced from benzene in any of the usual conversion steps, is fed into fractionating column 10 (e. g., a bubble cap or a packed tower; i. e. a system for separating xylene from maleic anhydride) through the feed inlet 11. The solution enters the dehydration zone 12 where it is subjected to a dehydration temperature in the presence of a large excess of a water-immiscible entraining material such as xylene. The water is rapidly volatilized and removed from the dehydration zone. The large excess of xylene minimizes the tendency of water and maleic anhydride to react. The maleic acid is kept at an elevated temperature for the minimum time necessary for its dehydration, so as to minimize its tendency to isomerize to fumaric acid. The vapors of xylene and water are taken off overhead through line 15, passed to condenser 17, and the condensate passed through line 19 to decanter 21. The water (lower layer) is removed from the decanter through line 23 and discarded. The xylene (upper layer) is removed from the decanter through line 25 and returned to the top of the fractionating column, as a reflux. The maleic acid anhydride flows downwardly from the dehydration zone and is gradually stripped of excess xylene. The xylene-free maleic acid anhydride is removed at the lower end of the column through line 14 and passes through pump 16 to line 18 from which it may be passed to storage. A part of the maleic anhydride is taken off from line 18 through line 20 and passed to boiler 22 wherein it is vaporized and the vapors then passed through line 24 to the lower portion of the fractionating column in order to supply heat thereto.

The process is conducted in a truly continuous and countercurrent style. After the maleic acid anhydride is formed, the entraining liquid is stripped therefrom as desired. The free water, if aqueous maleic acid is used as a feed, and also the water formed by the dehydration of the maleic acid to the acid anhydride passes up the column in a vapor form together with a large excess of vapors of the entraining agent, and is not condensed until after it leaves the fractionating column and enters the condenser.

The process is also applicable to other dicarboxylic acids which form inner acid anhydrides such as phthalic acid and succinic acid. The entraining agent is typified by xylene, but other water-immiscible materials which boil under the dehydration conditions may be used, e. g., toluene, and the like.

In order to illustrate and point out some of the advantages of the invention, but in no sense as a limitation on the invention as otherwise disclosed and set forth herein, the following embodiment is included. In accordance with the above described procedure, the following conditions are maintained in a continuous process:

Feed strength_____40 weight per cent aqueous maleic acid solution.
Entraining agent_____Xylene.
Temperature feed zone_____350° F. (substantially the boiling point of the entraining agent).
Temperature base of column__400° F. (substantially the boiling point of maleic anhydride under base of column pressure).

Substantially quantitative conversion of the maleic acid to maleic anhydride is obtained, with considerably less than 2 per cent conversion of maleic acid to fumaric acid.

Although the temperature at the base of the column may be somewhat lower than indicated above, the temperature of about the boiling point of maleic anhydride is preferred since an especially good final product is obtained under such conditions.

In starting the process, the xylene or other entraining agent may be introduced through the feed inlet; and during the process, if there are any losses of entraining agent, more of the agent may be introduced through the feed inlet.

In view of the foregoing disclosures, variations and modifications of the invention will be apparent to those skilled in the art. The invention includes all such variations and modifications broadly except as do not come within the scope of the appended claims.

I claim:

1. A process for obtaining maleic anhydride from an aqueous solution of maleic acid which comprises feeding the aqueous solution of maleic acid into a body of a water-insoluble organic liquid which has a boiling point in the range of 120–145° C. and is inert to maleic anhydride while maintaining said body of organic liquid at a temperature above the boiling point of the azeotropic mixture of said organic liquid with water, distilling from the aqueous solution of maleic acid substantially all of the solvent water and the combined water as an azeotropic mixture with said organic liquid as rapidly as the water is fed into the body of organic liquid whereby maleic anhydride is formed and dissolves in the body of organic liquid, and recovering maleic anhydride from the solution of maleic anhydride in the organic liquid.

2. A process according to claim 1 in which the organic liquid is xylene.

3. A continuous method for producing maleic anhydride substantially free from fumaric acid from an aqueous solution of maleic acid, which method comprises continuously feeding said solution into the dehydration zone of a continuous fractionating system at a point intermediate its ends, said dehydration zone containing a water-insoluble organic liquid which has a boiling point of 120–145° C. and is inert to maleic anhydride maintained at a temperature sufficient to convert the maleic acid into maleic anhydride and to vaporize the water of solution and of hydration, immediately and separately removing the water vapor and the formed maleic anhydride from the dehydration zone, continuously withdrawing from the system vapors of water and of said organic liquid, continuously returning to the system organic liquid, continuously stripping maleic anhydride from the organic liquid, and continuously supplying heat to the system to heat and vaporize the organic liquid.

4. A continuous method of producing maleic anhydride substantially free from fumaric acid from an aqeous solution of maleic acid, which comprises continuously passing said solution into a dehydration zone located intermediate the ends of a continuous fractionating column and subjecting said solution in the dehydration zone at a point adjacent the point of solution entry to a water-insoluble liquid which has a boiling point of 120–145° C. and which is inert to maleic anhydride in vapor phase at a temperature sufficient to convert the maleic acid to anhydride and to vaporize the water of solution and of hydration, immediately passing the water vapor in admixture with a portion of the organic liquid upwardly out of the dehydration zone and simultaneously passing the maleic anhydride produced by the decomposition of the maleic acid and a portion of the organic liquid downwardly from the dehydration zone through a stripping zone and, withdrawing mixed water and organic liquid vapors from the column at a point above the dehydration zone, withdrawing maleic anhydride from the column at the stripping zone, continuously supplying fresh organic liquid in liquid phase to the upper portion of the column to replace the organic liquid withdrawn in vapor phase with the water vapor, and continuously heating the lower portion of the column to heat and vaporize the organic liquid.

5. A method as set forth in claim 4 wherein the organic liquid is xylene.

6. A method as set forth in claim 4 wherein the initial aqueous maleic acid solution supplied to the dehydration zone comprises about 40% maleic acid and the remainder water.

7. A method as set forth in claim 4 wherein the temperature of the solvent vapor adjacent the point of entry of the aqueous maleic acid solution is about 350° F.

8. A process as set forth in claim 4 wherein the mixed water and organic liquid vapors withdrawn from the upper portion of the column are condensed, the water and organic liquid separated and the organic liquid returned in liquid form to the upper portion of the column.

9. A process for the preparation of maleic anhydride which comprises continuously introducing an aqueous solution of maleic acid at a feed inlet point in an upper portion of a fractionating column, said column having a dehydration zone adjacent said feed inlet point, continuously refluxing within the column in its upper portion above the feed inlet and in said dehydration zone a water-insoluble organic liquid which has a boiling point in the range of 120–145° C. and is inert to maleic anhydride, continuously removing a vaporized azeotrope of water and said inert organic liquid from the upper portion of the column, continuously passing the maleic acid as it is freed of aqueous solvent with additional organic liquid downwardly through said dehydrating zone countercurrently to vapors of the organic liquid, continuously passing downwardly from said dehydrating zone a resulting solution of maleic anhydride in a residual portion of the organic liquid into a stripping zone where the organic liquid is vaporized to form the vapors passed up through the dehydrating zone, and removing maleic anhydride from a bottom portion of the column below said stripping zone.

10. A process according to claim 9 in which said organic liquid is xylene.

References Cited in the file of this patent

UNITED STATES PATENTS

| Number | Name | Date |
|---|---|---|
| 1,424,138 | Bailey et al. | July 25, 1922 |
| 2,050,235 | Othmer | Aug. 4, 1936 |
| 2,140,140 | Punnett | Dec. 13, 1938 |
| 2,166,556 | Spence | July 18, 1939 |
| 2,340,490 | Porter | Feb. 1, 1944 |
| 2,462,444 | Weiss | Feb. 22, 1949 |